(12) United States Patent
Zaiser et al.

(10) Patent No.: US 7,445,262 B2
(45) Date of Patent: Nov. 4, 2008

(54) FUNCTIONAL UNIT FOR A VEHICLE INTERIOR

(75) Inventors: Markus Zaiser, Koengen (DE); Peter Seidl, Lorch (DE); Thomas Seeg, Ostfildern (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/788,955

(22) Filed: Apr. 23, 2007

(65) Prior Publication Data

US 2007/0194584 A1    Aug. 23, 2007

Related U.S. Application Data

(63) Continuation of application No. 11/058,568, filed on Feb. 15, 2005, now abandoned.

(30) Foreign Application Priority Data

Feb. 18, 2004    (DE) .................. 10 2004 008 874

(51) Int. Cl.
    *B60R 5/04* (2006.01)
(52) U.S. Cl. .............................. 296/24.43; 160/370.22; 296/37.16
(58) Field of Classification Search ............... 296/24.43, 296/24.44, 37.8, 37.16, 98, 100.01, 100.11, 296/100.12; 160/133, 181, 183, 270, 271, 160/273.1, 370.22, 267.1, 274, 282, 284, 160/285, 287; 410/130, 150
    See application file for complete search history.

(56) References Cited

U.S. PATENT DOCUMENTS

| | | |
|---|---|---|
| 4,139,231 A | 2/1979 | Lang et al. |
| 4,289,346 A | 9/1981 | Bourgeois |
| 4,480,675 A | 11/1984 | Berkemeier |
| 5,224,748 A | 7/1993 | Decker et al. |
| 5,338,084 A | 8/1994 | Wardell |
| 5,538,306 A | 7/1996 | Ament |

(Continued)

FOREIGN PATENT DOCUMENTS

DE          101 34 085 C1     1/2003

(Continued)

OTHER PUBLICATIONS

European Patent Office Search Report dated Jan. 21, 2005 (3 pages).

(Continued)

*Primary Examiner*—D. Glenn Dayoan
*Assistant Examiner*—Paul A Chenevert
(74) *Attorney, Agent, or Firm*—Flynn, Thiel, Boutell & Tanis, P.C.

(57) ABSTRACT

A functional unit for a vehicle interior has a dimensionally stable functional profile including two mutually opposite end regions which are arranged in a longitudinally movable manner along profiled guide structures arranged in the vehicle interior. Provision is made for each end region to be provided with at least one rolling element, which is mounted on the end region in a manner such that it can rotate about at least one axis of rotation such that, during a longitudinal movement of the end region, the rolling element rolls along at least one surface region of the associated profiled guide structure. The functional unit is used for loading-space coverings in passenger vehicles.

4 Claims, 2 Drawing Sheets

U.S. PATENT DOCUMENTS

Figure 1:
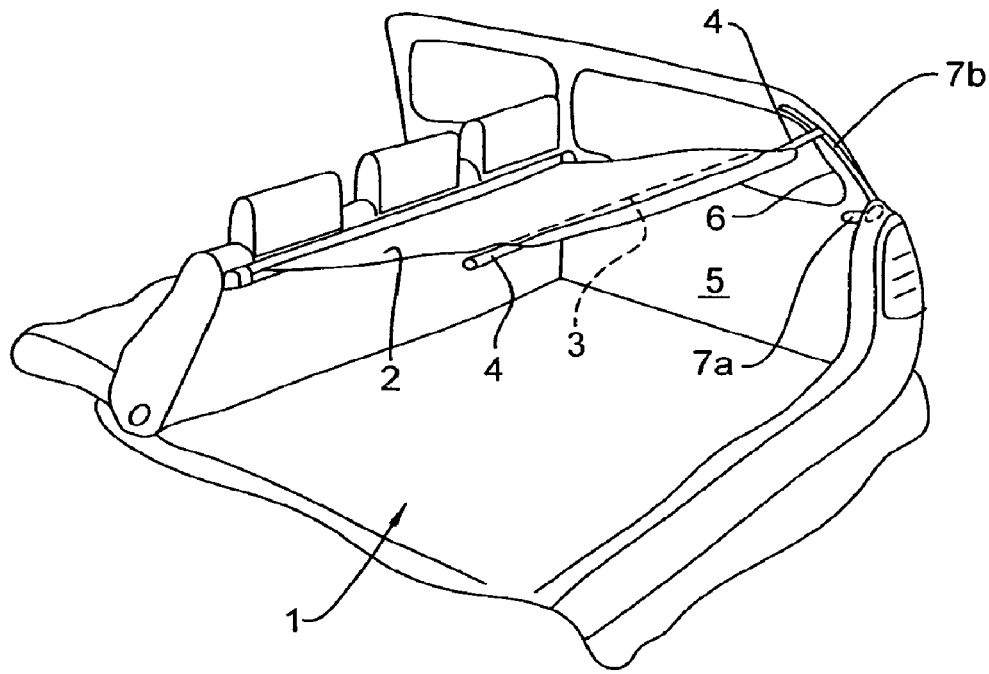

| | | |
|---|---|---|
| 6,402,217 B1 | 6/2002 | Ament et al. |
| 6,416,103 B1 | 7/2002 | Laudenbach et al. |
| 6,471,282 B2 | 10/2002 | Hanning |
| 6,488,325 B1 | 12/2002 | Ehrenberger et al. |
| 6,871,894 B2 | 3/2005 | Zummack |
| 7,021,692 B2 | 4/2006 | Laudenbach et al. |
| 7,055,877 B2 | 6/2006 | Sparrer et al. |
| 2005/0012352 A1 | 1/2005 | Sparrer et al. |

FOREIGN PATENT DOCUMENTS

| | | |
|---|---|---|
| EP | 0 405 232 A2 | 1/1991 |
| EP | 1 332 919 A2 | 8/2003 |

OTHER PUBLICATIONS

European Patent Office Office Action dated May 19, 2006 (3 pages).

FUNCTIONAL UNIT FOR A VEHICLE INTERIOR

CROSS-REFERENCE TO RELATED APPLICATIONS

This application is a continuation of U.S. Ser. No. 11/058,568, filed Feb. 15, 2005 now abandoned, which is incorporated herein in its entirety. The following disclosure is based on German Patent Application No. 10 2004 008 874.8 filed Feb. 18, 2004, which is incorporated into this application by explicit reference.

The invention relates to a functional unit for a vehicle interior, having a dimensionally stable functional profile which has two mutually opposite end regions which are arranged in a longitudinally movable manner in profiled guide structures arranged in the vehicle interior.

A functional unit of this type for a vehicle interior is known in general in the form of a loading-space covering for station wagons. A loading-space covering of this type has a covering tarpaulin which is held in a manner such that it can be wound up and unwound on a winding shaft mounted in a cassette housing. On its end region which is in front in the extension direction, the covering tarpaulin is provided with a dimensionally stable extension bar which has end regions protruding laterally over the side edges of the covering tarpaulin. The end regions can be positioned in guide rails laid horizontally just below a sill line of the vehicle interior, and, in the longitudinal direction of these guide rails, can be displaced transversely with respect to a longitudinal axis of the extension rod and are therefore arranged in a longitudinally movable manner. As a result, it is possible to guide the extension rod in a defined manner during an extension or retraction movement of the covering tarpaulin. Longitudinal movements, i.e. in particular displacement movements, lead, between the end regions of the extension rod and the guide rails in the vehicle interior, to a sliding resistance which increases the manual operating forces when extending the covering tarpaulin.

It is the object of the invention to provide a functional unit of the type mentioned at the beginning which permits a smooth-running longitudinal movement of the functional profile within the profiled guide structures.

This object is achieved in that each end region is provided with at least one rolling element, which is mounted on the end region in a manner such that it can rotate about at least one axis of rotation such that, during a longitudinal movement of the end region, the rolling element rolls along at least one surface region of the associated profiled guide structure. Those running surfaces on each profiled guide structure that come into contact with the at least one rolling element are, in particular, to be regarded as the surface regions of the profiled guide structures. In particular, guide rails, guide grooves or other linear profiled structures which are arranged rectilinearly and/or in a curved manner in the vehicle interior, preferably on lateral boundary surfaces of the vehicle interior, are provided as the profiled guide structures. The profiled guide structures may be seated on corresponding boundary surfaces or else may be integrated into these boundary surfaces. Corresponding profiled guide structures are preferably integrated into paneling parts of vehicle body pillars and extend above and/or below or level with a vehicle sill edge. Profiled guide structures are preferably provided in the region of body D-pillars and, approximately level with a vehicle sill edge, extend along these body D-pillars, in each case integrated in D-pillar paneling parts, in the direction of a roof lining of the vehicle interior. The solution according to the invention makes it possible for the functional profile to be moved in an extremely smooth-running manner in the profiled guide structures. Owing to the fact that the functional profile is no longer guided in a sliding manner, but rather in a rollable manner in the profiled guide structures, in addition to the reduced resistance also a reduced production of noise can be achieved. The rolling elements are preferably mounted rotatably in each case about an individual axis of rotation. Wheels, rollers, cylinders or ball and also other types of rotatable bodies are provided as the rolling elements. It is possible, as rolling elements, to provide balls which mounted in a ball cage or a ball socket in a manner such that they can rotate in all degrees of freedom and therefore about all spatial axes of rotation.

In a refinement of the invention, a plurality of elements having mutually parallel or orthogonal axes of rotation are provided on each end region and are assigned in each case to different spatial surface regions in each profiled guide structure to provide a supporting rolling bearing. These rolling elements are therefore offset with respect to one another. The rolling elements do not have to bear simultaneously and over the entire length of the particular profiled guide structure against the different spatial surface regions. On the contrary, just a partial bearing in the region of different travel sections of the profiled guide structures is also possible. The simultaneous, supporting bearing of at least two rolling elements on mutually spaced-apart surface regions of each profiled guide structure, which regions are preferably designed as boundary surfaces of the profiled guide structure, permits a divisionally accurate, play-free positive guidance of the functional profile over a corresponding travel section of the profiled guide structures. The profiled guide structures are preferably arranged on opposite boundary sides of the vehicle interior and are oriented parallel to one another. The axes of rotation of the rolling elements are preferably oriented coaxially or parallel to a central longitudinal axis of the functional profile.

In a further refinement of the invention, at least one rolling element is arranged on the end side of the end region. A rolling element of this type is therefore arranged as an extension of the particular end region.

In a further refinement of the invention, at least one rolling element is arranged on the longitudinal side of the end region. A rolling element of this type preferably does not protrude over the end side of the end region and is arranged on the side of the end region. In each case, the rolling elements are oriented in such a manner that they are oriented along the directions of movement of the functional profile in order, during a corresponding longitudinal movement of the functional profile, to permit the desired rolling movements.

In a further refinement of the invention, at least one end region is arranged in a manner such that it can be displaced telescopically along a longitudinal axis of the functional profile. In a further refinement of the invention, a supporting-force device acts on the end region in at least one axial direction of the longitudinal axis of the profile. These refinements permit the end regions to be guided along profiles of the profiled guide structures that are curved in the plane of movement of the functional profile. As soon as the opposite profiled guide structures change their distance from one another during the course of the guide movement, the width of the functional profile is inevitably adapted by corresponding displacement of at least one end region. The supporting-force device serves to permit a permanent, end-side bearing of the end regions in order to be able to immediately detect correspondingly changing profiles of the profiled guide structures and, using a positive-guidance means, to bring about the adaptation.

Further advantages and features emerge from the claims and from the description below of preferred exemplary embodiments of the invention which are illustrated with reference to the drawings.

Figure 2:
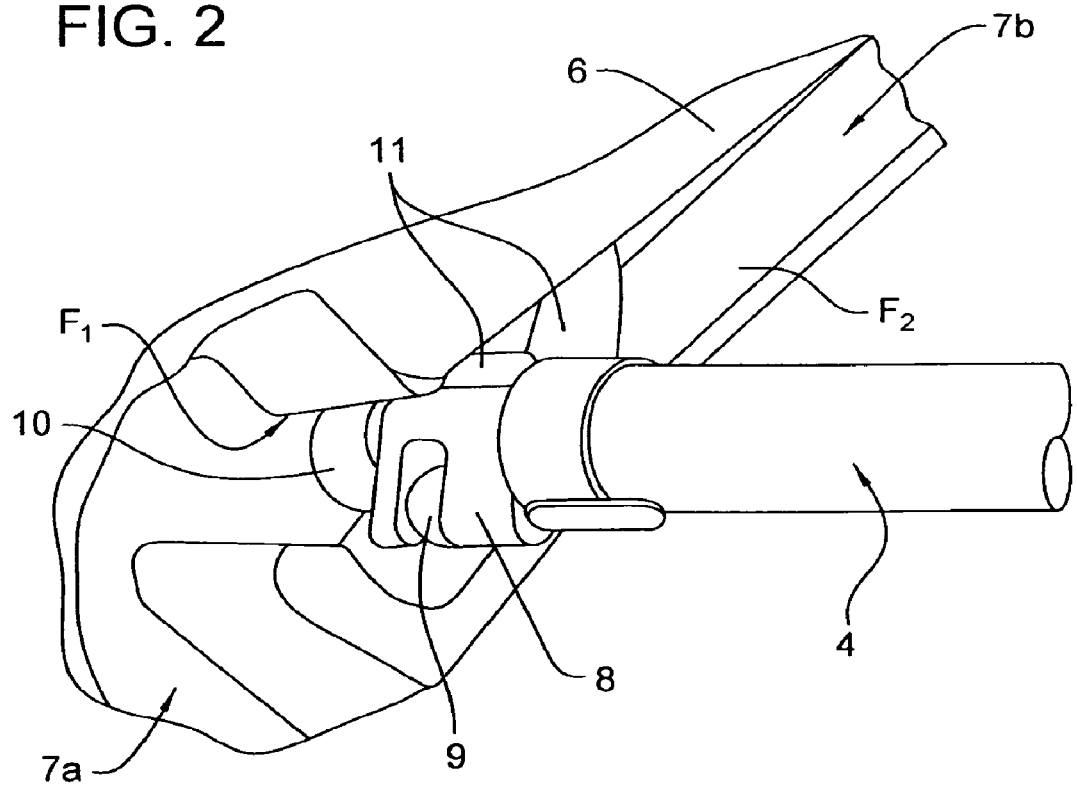
Figure 3:
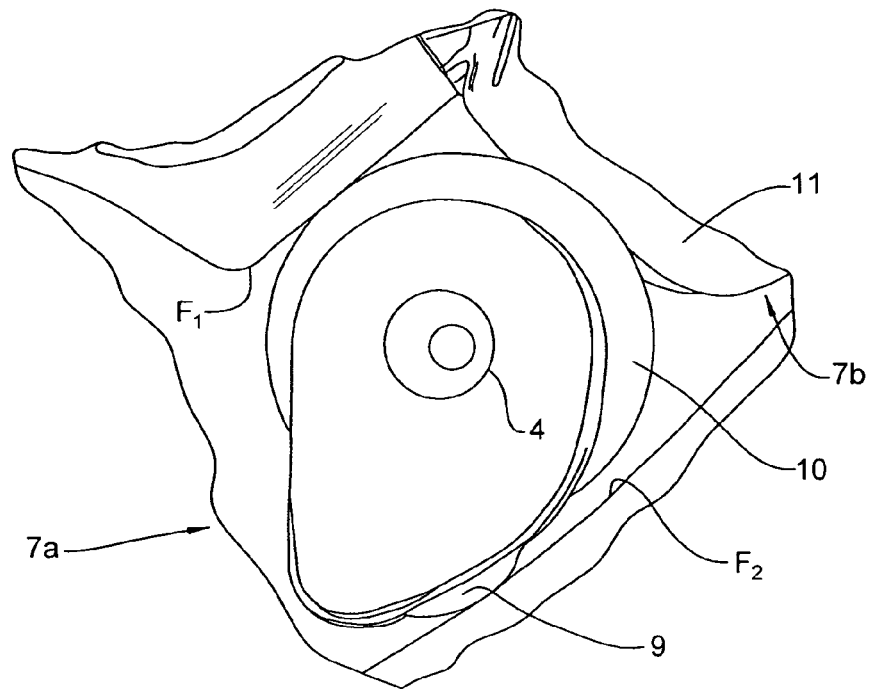
Figure 4:
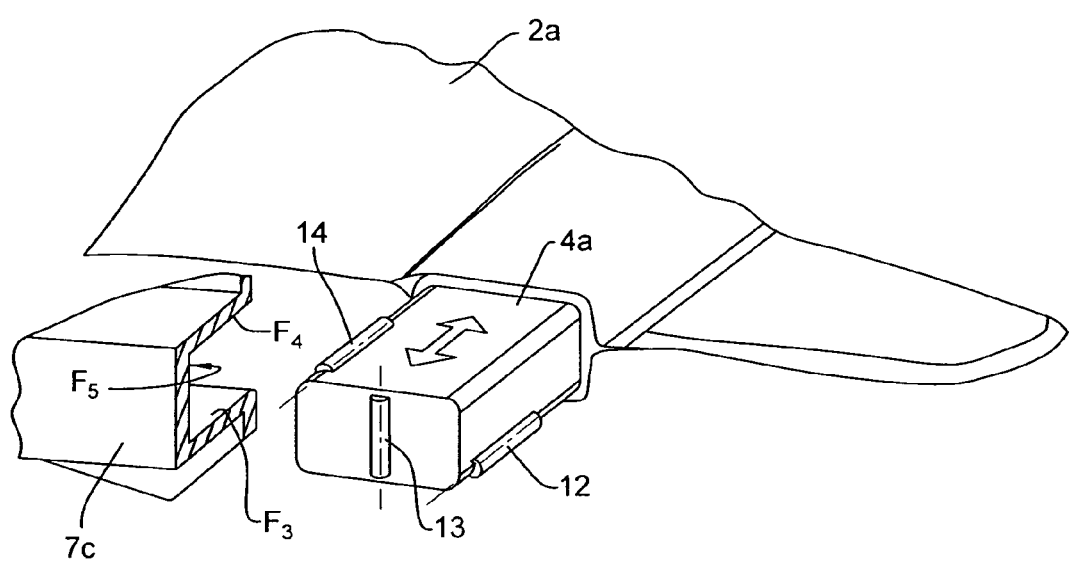

FIG. 1 shows, schematically in a perspective illustration, an embodiment of a functional unit according to the invention, FIG. 2 shows, in an enlarged, perspective illustration, a detail of the functional unit according to FIG. 1, FIG. 3 shows, in a further enlarged illustration and schematically, a cross section through a functional profile of the functional unit according to FIGS. 1 and 2, and FIG. 4 shows, in a perspective illustration, a detail of a further functional unit similar to FIGS. 1 to 3.

A vehicle interior for a motor vehicle, in the present case for a passenger vehicle having a steep rear, has a loading space 1 which is arranged behind a rear seat bench of a person-conveying region of the vehicle interior. The loading space can be expanded forward by displacing or folding over a backrest arrangement of the rear set bench. As a functional unit in the form of a loading-space covering, a covering tarpaulin 2 is provided which has a flexible surface structure which is held in a manner such that it can be wound up and unwound on a winding shaft mounted rotatably in a cassette housing. A restoring spring acts on the winding shaft in a manner basically known and subjects the winding shaft to spring force in the winding-up direction. In the. unloaded state, the covering tarpaulin 2 is therefore transferred into its rest position wound up in the cassette housing. The cassette housing is secured in the vehicle in the region of the backrest arrangement approximately level with a vehicle sill line of the vehicle body and the vehicle interior.

The covering tarpaulin 2 has, on its end region which is in front in the extension direction, a functional profile in the form of a dimensionally stable extension bar 3 which extends over the entire width of the covering tarpaulin 2 transversely with respect to the extension direction and protrudes outwards on both sides over a respective side edge region of the covering tarpaulin 2. These outwardly protruding regions are end regions 4 of the extension bar 3. In addition, a dimensionally stable contour part (not described specifically) which, in the extended state of the covering tarpaulin 2, closes a free space which still remains between the tailgate and the extension bar 3, is connected to the extension bar 3.

In its covering state, the covering tarpaulin 2 is drawn approximately horizontally out of the cassette housing towards the rear of the vehicle and is secured releasably in mounts 7a secured on the vehicle, preferably by fitting them in. The restoring force of the restoring spring arrangement which acts on the winding shaft tightens the covering tarpaulin 2 in its fitted-in covering position. In order to fix the covering tarpaulin 2 in its extended functional position, the end regions 4 of the extension bar 3 are fitted into the mounts 7a on the vehicle and are inevitably guided there in groove-shaped profiled guide structures 7b which, placed approximately level with the vehicle sill edge, extend obliquely upwards along rear-side body side pillars of the vehicle body into a roof frame region. The mounts 7a which are secured on the vehicle are also provided level with the rear-side body pillar regions in side wall panelings 5 on both sides of the tailgate. The mounts 7a on the vehicle are designed as guide groove sections which are curved in the manner of a chicane and are open in their lower end region in such a manner that the end regions 4 of the extension bar 3 can inevitably be introduced into these mounts 7a during an extension movement of the covering tarpaulin 2.

The groove-shaped profiled guide structures 7b are preferably also arranged spatially inside paneling parts 6 above the vehicle sill line along the rear-side body side pillars in such a manner that the profiled guide structures 7b do not protrude over an interior paneling contour facing the center of the interior. The profiled guide structures 7b are fitted flush into the interior paneling. The chicane-like guide groove sections 7a on each longitudinal side of the vehicle are adjoined upward by the profiled guide structure 7b which extends obliquely upward and forward in the longitudinal direction of the vehicle. The extension bar 3 would be forced forward and upward, with its end regions 4 along these profiled guide structures 7b, by the acting restoring force of the restoring spring arrangement of the winding shaft. In order to prevent this, a blocking element 11 is provided approximately level with the vehicle sill edge, which blocking element, in its blocking position, projects into the particular profiled guide structure 7b and forms a form-fitting stop for the extension bar 3 on each end region 4. The two blocking elements 11 in the opposite profiled structures 7b are mounted movably between the blocking position and a release position. In order to transfer the blocking elements 11 from their blocking position into the release position, in which they are moved out of the guide space of each profiled guide structure 7b, each blocking element 11 is assigned a control element (not illustrated specifically). The control elements are activated jointly or in synchronized fashion by a control unit in order to permit a simultaneous release or a simultaneous transfer of the blocking elements 11 into the blocking position.

In order to permit an extremely smooth-running movement of the end region 4 in the profiled guide structures 7b and thus to ensure that, after the end regions 4 have been released, the restoring force of the restoring spring arrangement of the winding shaft is sufficient in every case to transfer the extension bar 3 and therefore the covering tarpaulin 2 into an upper comfort position in an upper, front end region of the profiled guide structures 7b, both end regions 4 of the extension bar 3 are provided with rolling elements 9, 10 which roll at least temporarily on some sections along upper and lower guide surfaces $F_1$, $F_2$. The two rolling elements 9, 10 are designed as plastic rollers and are mounted on the end region 4 in a manner such that they can rotate about mutually parallel axes of rotation and are oriented parallel or coaxially with a central longitudinal axis of the extension bar 3. The two rolling elements 9, 10 protrude at least in some sections beyond the circumferential contour of the end region 4 in order to ensure that each end region 4 is supported on the guide surfaces $F_1$, $F_2$ of the particular profiled guide structure 7b exclusively via the rolling elements 9, 10 without an outer contour section of the particular end region 4 additionally also coming into sliding contact against one of the guide surfaces of the profiled guide structure 7b.

The rolling element 9 is mounted in a supporting section 8 of the end region 4 which has a slot- or groove-like mount in which to embed the rolling element 9. The supporting section 8 supports the rolling element 9 eccentrically with respect to a central longitudinal axis of the extension bar. The supporting section 8 is connected rigidly to the end region 4 or is an integral extension of the end region 4.

The second rolling element 10 is mounted on the end side of the end region 4 and therefore on the supporting section 8 and has a diameter of such a size that the rolling element 10 can be supported simultaneously on the upper guide surface $F_1$ and a stop surface of the blocking element 11. However, as can be seen with reference to FIG. 3, the diameter of the rolling element 10 is smaller than the height of the profiled guide structure 7b, with the result that the rolling element 10, in its bearing position against the blocking element 11 and the upper guide surface $F_1$, is kept at a distance from the lower guide surface $F_2$. As can also be seen with reference to FIG. 3, the axes of rotation of the rolling elements 9, 10 are offset with respect to one another radially and in the circumferential direction relative to a central longitudinal axis of the extension bar 3 and therefore of the end region 4. The rolling element 9 is, in particular, therefore arranged eccentrically with respect to the central longitudinal axis of the extension bar 3. This design is expedient, since the previously described, dimensionally stable contour part, which is positioned against the extension bar 3 toward the rear of the vehicle, exerts a tilting movement on the extension bar 3 and also on the end regions 4. Owing to the fact that the rolling elements 9, 10 which are offset with respect to each other are provided, this tilting movement inevitably results in the outer rolling element 10 being supported in a stable manner on the upper guide surface $F_1$ and the lower rolling element 9 being supported in a stable manner on the lower guide surface $F_2$. As a result, after the extension bar is released by the blocking element 11 being removed, a stable, play-free rolling movement of each end region 4 along the profiled guide structures 7b is achieved. The stable guidance of the extension bar because of the rolling elements 9, 10 bearing on the upper and lower sides means that the dimensionally stable contour part is held in a stable, constant tilting position during the entire movement travel of the extension bar obliquely upward.

In order to transfer the covering tarpaulin 2 from a rest position, in which it is wound up in the cassette housing, into the covering position, the covering tarpaulin 2 is extended approximately horizontally to the rear by hand. A handle element or a recessed grip is preferably provided here (in a manner not illustrated specifically) in the region of the contour part and facilitates the grasping of the covering tarpaulin 2 by hand. In the rear region of the loading space 1, the end regions 4 are introduced into the open regions of the guide groove sections 7a, which regions are arranged on the opposite side walls of the loading space 2, are in each case guided upward via the chicanes illustrated in FIG. 2, and are then let go of or released by the corresponding operator removing his hand from the contour part. The removal of the manual operating force causes the restoring force of the restoring spring arrangement of the winding shaft to exert a tensile load on the covering tarpaulin 2 in the winding-up direction, as a result of which the end regions 4 of the extension bar 3 are pressed against the blocking elements 11. The blocking elements 11 are positioned in their blocking position approximately level with the vehicle sill line, so that, in the stable position, the covering tarpaulin 2 is in an approximately horizontally extended covering state. If the tailgate or preferably an upper window part of the tailgate is then opened, each blocking element is activated together with the actuation, i.e. the opening, of the tailgate lock, and moves into its release position, as a result of which the restoring force acting in the winding-up direction on the covering tarpaulin 2 moves the extension bar 3 and the end regions 4 forward and upward along the profiled guide structures 7b as far as the front, upper end region of the profiled guide structures 7b. In this position, the covering tarpaulin 2 forms a comfort position, since the loading-space region situated under the covering tarpaulin 2 is easily accessible from the opened part of the tailgate. As soon as the operator no longer requires access to the loading space 1, the operator returns the covering tarpaulin 2 back into the horizontal covering position again by hand. As the end region 4 is guided past the blocking elements 11, the latter automatically snap into their blocking position again, so that the stable covering position for the covering tarpaulin 2 is reached again. The tailgate part, preferably the window part, can then be closed.

In the case of exemplary embodiments of the invention that are not illustrated, semi-automatic processes of moving the covering tarpaulin 2 are provided. In the case of embodiments of this type, the return again of the covering tarpaulin 2 from its upper comfort position into the covering position takes place by means of driving means, so that a manual operation or a manual return of the covering tarpaulin into the covering position is no longer required. In the case of embodiments of this type, it is also possible for flanking profiled guide structures to already be assigned along the horizontal extension movement of the covering tarpaulin 2, in which structures the end regions which are provided with the rolling elements run. These horizontal profiled guide structures are preferably also provided with driving means in order to permit an automatic transfer of the covering tarpaulin into the covering position. In embodiments of this type, a manual operation can be dispensed with.

In the case of the embodiment according to FIG. 4, a covering tarpaulin 2a is provided which, analogously to the embodiment according to FIGS. 1 to 3, is held in a manner such that it can be wound up and unwound on a winding shaft of a cassette housing or in a similar accommodating device. The covering tarpaulin 2a is also provided in its end region which is in front in the extension direction with an extension bar which is assigned a dimensionally stable contour part. The extension bar has a rectangular cross-sectional profile. The extension bar is guided with its opposite end regions 4a in horizontal, rail-like profiled guide structures 7c in a vehicle interior (not illustrated specifically). The profiled guide structure 7c has a lower guide surface $F_3$, an upper guide surface $F_4$ and an outer guide surface $F_5$. All three guide surfaces $F_3$ to $F_5$ are of flat design and are joined to one another orthogonally in a manner similar to a C-profile. Each guide surface $F_3$ to $F_5$ is assigned a respective rolling element 12 to 14 on the end region 4a. The rolling elements 12 to 14 have axes of rotation which are parallel in each case to the guide surfaces $F_3$ to $F_5$, and are mounted in a partially recessed manner in the outer contour of the end region 4a. All of the rolling elements are of cylindrical design. A lower rolling element 12 is mounted on a front edge of the end region 4a in the extension direction, an upper rolling element 14 is mounted on an upper and rear edge of the end region 4a in the extension direction and the outer rolling element 13 is mounted on the end surface of the end region 4a. In addition, the end regions 4a are mounted in a telescopically movable manner relative to the extension strip, in accordance with the double arrow illustrated in FIG. 4, so that they can be displaced coaxially within certain limits. As a result, a change in the length of the extension bar is made possible. This embodiment is particularly advantageous if the opposite profiled guide structures 7c do not extend parallel to one another, but rather change their distance from each other over the course of their length. The profiles of the profiled guide structures can therefore taper or widen relative to one another. The end regions 4a are acted upon by a force, are preferably loaded by a compression spring, outward along the extension bar by means of a supporting-force device in order to press the end surface and therefore the outer rolling element 13 of each end region 4a permanently against the lateral guide surface $F_5$. As a result, the particular end region 4a automatically perceives profiles of the profiled guide structure 7c which curve inward or outward and adapts accordingly.

In the case of the exemplary embodiments illustrated, loading-space coverings are provided as the functional units.

However, it is also possible to provide other types of functional units for a vehicle interior, which units have at least one functional profile which can be displaced along profiled guide structures within the vehicle interior. In particular, separating nets or separating structures of different design which can be extended approximately vertically upward into a protective position and in which a loading space is separated from a passenger space are suitable as functional units. Also pocket-like hanging mounts which are arranged displaceably in the loading space may be formed by functional units according to the invention. The same also applied to segmentation parts which are dimensionally stable at least in some sections and which can be displaced in the corresponding profiled functional structures within the loading space in order to provide variable space sections.

The invention claimed is:

1. A functional unit for a vehicle interior, comprising:
a rigid functional profile having a longitudinal axis passing through a length of said profile and through two mutually opposite end regions of said profile, said longitudinal axis of said functional profile being arranged in a transverse direction of said vehicle interior and each said end region being arranged for movement within a corresponding profiled guide structure,
wherein each profiled guide structure is arranged in a longitudinal direction of the vehicle interior, each end region of said functional profile being provided with a rolling element mounted on the end region, said functional profile being supported by said rolling element on a surface region of said corresponding profiled guide structure, said rolling element having an axis of rotation parallel to said longitudinal axis of said functional profile at said end region and eccentric to a centerline of said functional profile, and said rolling element being partially shrouded within said end region of said functional profile.

2. A functional unit for a vehicle interior, comprising:
a rigid functional profile which has two mutually opposite end regions, said end regions being arranged for longitudinal movement along profiled guide structures arranged in the vehicle interior;
a first rolling element mounted on each end region in a manner that it can rotate about an axis of rotation parallel to a longitudinal axis of the functional profile such that, during a longitudinal movement of the functional profile, the first rolling element is supported by and runs along at least one surface region of the associated profiled guide structure; and
a second rolling element on each end region having an axis of rotation orthogonal to the axis of rotation of the first rolling element and arranged to run along a second surface region of each profiled guide structure.

3. The functional unit according to claim 2, wherein at least one of said end regions can be displaced telescopically along said longitudinal axis of the functional profile.

4. The functional unit according to claim 3, wherein a supporting-force device acts on said at least one of said end regions that can be displaced telescopically along said longitudinal axis of the functional profile.

* * * * *